United States Patent [19]

Grammerstorf

[11] 4,269,014
[45] May 26, 1981

[54] PROCESS FOR FASTENING A BONDING AND SEALING DEVICE TO CONSTRUCTION COMPONENTS AND/OR BUILDINGS BY FORCING INJECTION MATERIAL INTO CRACKS, FLAWS, AND THE LIKE

[75] Inventor: Werner Grammerstorf, Munich, Fed. Rep. of Germany

[73] Assignee: IPA Bauchemie GmbH, Egling, Fed. Rep. of Germany

[21] Appl. No.: 62,348

[22] Filed: Jul. 31, 1979

[30] Foreign Application Priority Data

Jul. 31, 1978 [DE] Fed. Rep. of Germany ....... 2833546

[51] Int. Cl.³ ............................................. E04D 15/00
[52] U.S. Cl. ........................................ 52/749; 52/744
[58] Field of Search .......................... 52/744, 704, 749; 264/36, 155; 405/266, 269

[56] References Cited

U.S. PATENT DOCUMENTS

| 1,883,196 | 10/1932 | Wertz ................................. 52/514 X |
| 3,492,827 | 2/1970 | Stevens ............................... 52/744 X |
| 3,572,956 | 3/1971 | Liscum ................................. 52/744 X |
| 3,986,536 | 10/1976 | Janson ................................. 405/269 X |
| 4,103,498 | 8/1978 | Steinborn et al. ................ 52/744 X |
| 4,120,128 | 10/1978 | Pauls .................................... 52/744 X |

FOREIGN PATENT DOCUMENTS

| 588407 | 11/1933 | Fed. Rep. of Germany . |
| 6921043 | 4/1969 | Fed. Rep. of Germany . |
| 1534902 | 8/1975 | Fed. Rep. of Germany . |
| 7532327 | 10/1975 | Fed. Rep. of Germany . |

*Primary Examiner*—Carl D. Friedman
*Attorney, Agent, or Firm*—Birch, Stewart, Kolasch & Birch

[57] ABSTRACT

A device is disclosed which fastens and retains a bonding and sealing device in a drilled hole in construction parts or in buildings by forcing injection material, such as snythetic resins into cracks and flaws present on the construction parts or on the building component. A sealing bushing encases a portion of a sleeve. The sleeve is expanded from its inside thereby sealingly clamping the sealing bushing between the walls of the drilled hole and the encased portion of the sleeve.

9 Claims, 1 Drawing Figure

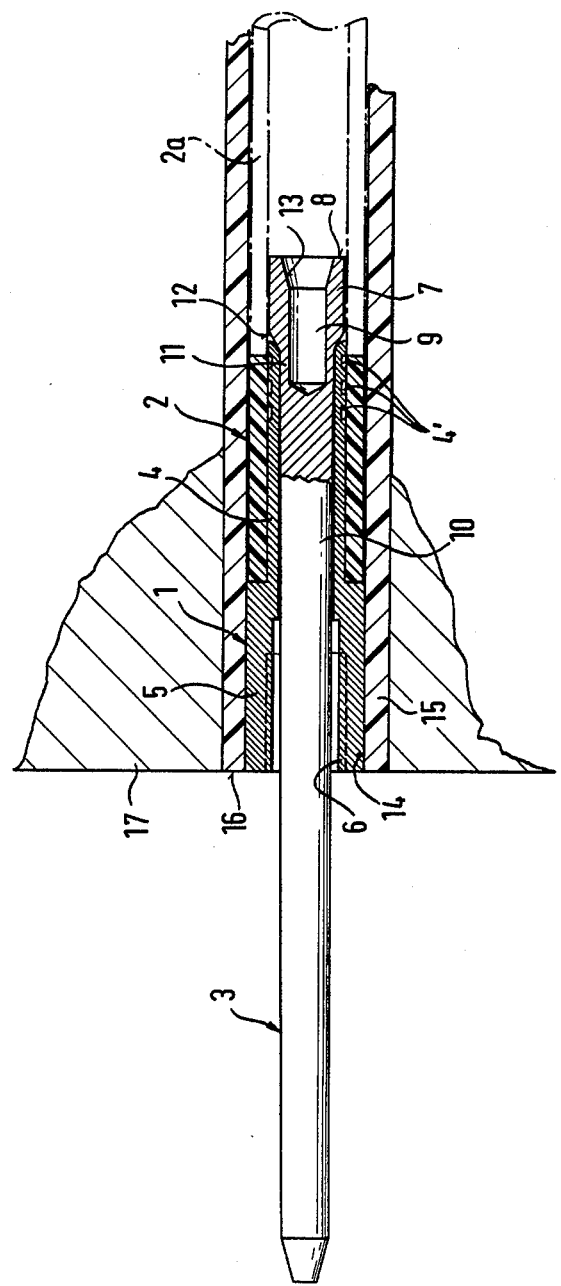

PROCESS FOR FASTENING A BONDING AND SEALING DEVICE TO CONSTRUCTION COMPONENTS AND/OR BUILDINGS BY FORCING INJECTION MATERIAL INTO CRACKS, FLAWS, AND THE LIKE

BACKGROUND AND SUMMARY OF THE INVENTION

The present invention relates to a device used to fasten and retain a bonding and sealing device in a drilled hole of construction parts or buildings by forcing injection material, such as synthetic resins, synthetic resin solutions, and other fluids into cracks, flaws, etc. of the construction parts or buildings.

In a conventional process, e.g., German Pat. No. 1,534,902, the sealing bushing is axially compressed so that it expands radially and thereby retains the sleeve in the drilled hole. In the device known for conducting this process, the elongated sleeve is fashioned as a cylindrical tube provided with an external thread at least at the ends. A piece of reinforced rubber pressure hose is placed over the tube end, this hole being compressible by means of washers, a spacer ring, and nuts threaded onto the thread, in order to increase the diameter, one of the nuts being arranged in the drilled hole in the construction part and/or building. This device consists of many individual parts and is cumbersome in handling, since the danger exists during use that the nut present in the construction part and/or building participates in the rotation of the outer nut when the latter is being tightened; consequently, the compression of the rubber pressure hose to enlarge its diameter and thus the attachment of this device in the drilled hole becomes cumbersome and time-consuming. Another disadvantage of this device resides in the fact that the end of the tube projecting from the drilled hole must be hammered off or sawed off after the synthetic resin or the like has been forced into the hole. During this step, the wall is frequently damaged in the zone of the drilled hole. Besides, there is the danger that the edge of the drilled hole breaks away; as a result, the sealing effect attained is insufficient, and the forced-in material escapes besides the seal. Furthermore, there is the danger in the conventional process that the external nut is tightened too much and the sleeve is torn off.

This invention is based on the problem of providing a process for fastening a bonding and sealing device in a drilled hole of construction parts or buildings and a device for executing this process, wherein the device can be mounted in a simple way, rapidly, and accurately in drilled holds by unskilled labor, and wherein the device consists of a minimum of structural parts and ensures a secure seal.

This problem has been solved in accordance with the present invention wherein a process and a device used for conducting this process forces injection materials into cracks and flaws in the construction parts or buildings. The sleeve of the device of the present invention is inserted into the drilled hole until it is flush with the wall. Thereafter, the portion of the sleeve encased by the sealing bushing is inwardly expanded at least over part of its length by pulling out the pull pin (for example by means of riveting tongs), this expansion being effected by the head of the pull pin, until the pull pin is torn off in the proximity of its head in the zone of the blind hole so that free access is provided through the sleeve into the interior of the drilled hole. Since the expansion takes place from the inside, the rim of the drilled hole cannot break away.

Because of the blind hole which extends into the end of the pull pin shank adjoining the head, on the head side, a predetermined breaking zone is produced where the shank will be torn off during pulling of the pull pin, thus providing access to the interior of the drilled hole. The conical transition zone between head and shank facilitates the widening of the thin-walled portion of the sleeve. The clearance between the smallest inner diameter of the sleeve and the shank diameter avoids excess friction between these two parts, and the slightly tight fit at the head-side end of the shank prevents losing the pull pin inserted in the sleeve. The expansion of the blind hole toward the open side facilitates, after pulling of the pull pin, the penetration of the injection material. The indentation at the free end of the sleeve facilitates the insertion of the pull pin. The annular grooves on the outer periphery of the thin-walled portion of the sleeve in the proximity of its free end yield an especially firm attachment of the sealing bushing after fastening of the device. A sealing bushing extended into a hose reaching into a substantial depth of the drilled hole makes it possible to exert pressure from the inside of the drilled hole, the pressure of the injection material being effective at the end of the sealing bushing or hose present far inside the drilled hole.

The device of this invention is also suitable especially advantageously for use in conjunction with a feed tube inserted in a drilled hole and sealed at the inlet end of the hole, for example by means of a synthetic resin with respect to the wall of the drilled hole, since no torsional forces occur during the insertion of the device, which could cause leakage between the feed tube and the wall of the drilled hole. The free end of the thick-walled portion of the sleeve is provided with an internal thread; a lubricating nipple provided with a ball check valve can be threaded into this internal thread to be able to introduce the injection material under high pressure.

Accordingly, one object of the present invention is to provide for a bonding and sealing device which possesses none of the disadvantages of prior art devices of this kind.

Another object of the present invention is to provide for a bonding and sealing device which can be mounted in drilled holes simply, rapidly, and accurately without the need to utilize skilled labor.

Still another object of the present invention is to provide for a bonding and sealing device which consists of a minimum number of structural parts and also ensures a secure seal.

Still another object of the present invention provides for a bonding and sealing device which can be sealed to a drilled hole in construction components or buildings by forcing injection material, such as synthetic resins into cracks and flaws in the construction parts or buildings.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein FIG. 1 is one embodiment of the bonding and sealing device of the present invention shown in the cross section.

DETAILED DESCRIPTION OF THE INVENTION

Referring to FIG. 1, a bonding and sealing device is shown for forcing synthetic resins, synthetic resin solutions, and other fluids into cracks, flaws, and the like in construction parts and/or buildings. The device consists essentially of an elongated sleeve 1 of metal, a sealing bushing 2 of an elastic material, and a pull pin 3. The pull pin 3 consists of a harder material than the sleeve 1. The sleeve 1 is preferably manufactured of aluminum, an aluminum alloy, copper, or a copper alloy, whereas the pull pin 3 is preferably made of steel. The sealing bushing 2 consists of an elastic synthetic resin or some other elastomer. The sealing bushing 2 can be lengthened into a hose 2a extending substantially past the end of sleeve 1. The sleeve 1 has a thin-walled portion 4 and a thick-walled portion 5. An internal thread 6 is provided at the free end of the thick-walled portion 5; a lubricating nipple with a check valve can be threaded into this internal thread, wherein the check valve is passable in the direction of the thin-walled portion 4 of sleeve 1. The sealing bushing 2 is in close contact with the thin-walled portion 4 of the sleeve 1. The thick-walled portion 5 essentially has the same outer diameter as the sealing bushing 2. On the outside of the free end of the thin-walled portion 4, annualar grooves 4' are arranged effecting a firm seating of the bushing 2. The drilling bore of the sleeve is countersunk from the free end of the thin-walled portion 4.

The pull pin 3 is provided with a head 7 having a co-axial blind hole 9 extending from the end face 8. The blind hole 9 is extended into the end of the shank 10 of the pull pin 3 on the head side and here forms a predetermined breaking zone 11. A conical transition zone 12 is provided between shank 10 and head 7 facilitating the pulling of the head 7 into the thin-walled portion 4 of sleeve 1. The shank diameter is somewhat smaller than the smallest inner diameter of sleeve 1, so that a minor play exists between both parts and no unnecessary friction occurs between shank 10 and sleeve 1. Only towards the end on the head side, shortly before passing over into head 7, the shank 10 is slightly thicker, so that a slightly tight fit is attained between shank 10 and sleeve 1. Therefore, the pull pin 3 is prevented from slipping out of the sleeve 1 and getting lost. A widening 13 of the blind hole 9 toward the end face 8 of the head 7 facilitates the subsequent passage of the injection material.

In FIG. 1, the device is shown while inserted in a drilled hole and/or a bore 14 of a feed tube 15. The drilled hole 14, however, can be arranged just as well without a feed tube 15 in the wall 17 of a construction part or building. The type of illustration selected is merely for the purpose of demonstrating the versatility in using the device.

For mounting purposes, the device is inserted in the drilled hole 14 to such an extent that the free end of the thick-walled portion 5 of the sleeve 1 ends flush with the end face 16 of the feed tube 15 and/or of the wall 17. Then, a pair of riveting tongs resting against the sleeve 1 is used for pulling at the pull pin 3 until the latter has expanded the thin-walled portion 4 at least along part of its length and is torn off in the proximity of its head 7. By the expansion step, the sealing bushing is pressed in place between the thin-walled portion 4 of the sleeve 1 and the wall of the drilled hole. Thereby, there is not only a satisfactory seal of the drilled hole 14, but also attained is a very firm sealing of the device in this hole. The radial pressure is produced far inside the drilled hole so that the outer rim of the drilled hole 14 cannot break away. After tearing off the shank 10 of the pull pin 3 at the predetermined breaking zone 11, free access is provided from the thick-walled portion 5 of sleeve 1 through the thin-walled portion 4 and th e previous blind hole 9 of the head 7 remaining within the sleeve 1. At this point in time, a lubricating nipple can be threaded into the inner thread in the thicker portion 5 of the sleeve 1 and then injection material can be forced into the drilled hole. After curing of the injection material, it is merely necessary to unscrew the lubricating nipple to obtain a flush surface with the end face of the feed tube and/or of the wall, which can readily be caulked [smoothed with filler].

If the sealing bushing 2 is lengthened into a hose 2a as indicated in the drawing in dot-dash lines, then it is possible to allow the injection material to exit at any desired depth in the drilled hole, so that the pressure is most effective at the exit point. Thus, even in case of very deep drilled holes, a satisfactory and far-reaching bond can be attained by means of injection material. The bonding and sealing device can be mounted in drilled holes by means of simple riveting tongs by unskilled personnel. Due to the selection of the material for the sleeve, the sealing bush, and the pull pin, and of their dimensions, it is always possible to attain a sufficient contact pressure between the sleeve and the sealing bushing and/or the sealing bushing and the wall of the drilled hole, thus ensuring not only a secure seal, but also an extraordinarily firm seating of the device within the drilled hole.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for fastening a bonding and sealing device in a drilled hole by forcing injection material into cracks or flaws of construction parts or buildings comprising:
    an elongated sleeve;
    a sealing bushing of an elastic material, said bushing encasing at least a portion of said sleeve and being radially expandable from the inside thereof; and
    pull pin means arranged within said sleeve for expanding from the inside at least a portion of the length of said sleeve encased by said sealing bushing, said sealing bushing being sealingly clamped between the wall of said drilled hole and the encased portion of said sleeve;
    said pull pin means including a shank, and a head adapted to be torn off, said head of said pull pin means including a coaxial blind hole extending into the end of said pull pin means toward the shank thereof.

2. A device for fastening a bonding and sealing device in a drilled hole by forcing injection material into cracks or flaws of construction parts or buildings comprising;
an elongated sleeve of metal;
a sealing bushing of an elastic material, said bushing encasing at least a portion of said sleeve; and
means for expanding the portion of said sleeve encased by said sealing bushing outwardly from the inside of said sleeve after insertion of said device in said drilled hole, the portion of said sleeve being expanded at least over a portion of its length to such an extent that said sealing bushing is sealingly clamped between the wall of said drilled hole and the encased portion of said sleeve, said means for expanding including pull pin means having a shank and a head, said pull pin means being arranged within the sleeve and adapted to be torn off, the head of said pull pin means having a coaxial blind hole extending into the end of the head of said pull pin means and toward the shank of the pull pin means.

3. The device according to claim 2, wherein the portion of the sleeve encased by the sealing bushing is relatively thin-walled;
wherein a relatively thick-walled portion adjoins the thin-walled portion of said sleeve, said thick-walled portion having approximately the same outer diameter as the outer diameter of said sealing bushing;
wherein the pull pin means is inserted into the sleeve from the free end of the thin-walled portion of said sleeve and projects out of said sleeve from the other end thereof; and
wherein the diameter of the shank of said pull pin means corresponds substantially to the inner diameter of the thin-walled portion of said sleeve and the diameter of the head of said pull pin means corresponds substantially to the outer diameter of the thin-walled portion of said sleeve.

4. The device according to claims 1, 2, or 3, wherein a conical transition zone is arranged between the head and the shank of said pull pin means.

5. The device according to claim 4, wherein a clearance is provided between the smallest inner diameter of the sleeve and the outer diameter of said shank; and
wherein the shank of said pull pin means has a short section on the end of said shank nearest the head, said short section having a slightly larger outer diameter than the outer diameter of said shank thereby tightly holding said pull pin means in said sleeve.

6. The device according to claim 5, wherein said blind hole has a widened portion in said head of said pull pin means and extending toward the open side of said head thereof.

7. The device according to claim 6 wherein the thin-walled portion of the sleeve is indented and countersunk at the free end of said sleeve and on the inside thereof.

8. The device according to claim 7 wherein the thin-walled portion of the sleeve includes at least one annular groove around the outer periphery of said sleeve and in the proximity of the free end of said sleeve.

9. The device according to claim 8 wherein a portion of said sealing bushing comprises a hose, said hose being longer than the thin-walled portion of said sleeve.

* * * * *